April 9, 1940.  S. B. McDONALD  2,196,397

COLOR CHART

Filed Oct. 20, 1937

Inventor:
Sterling B. McDonald,

Attorneys.

Patented Apr. 9, 1940

2,196,397

UNITED STATES PATENT OFFICE 2,196,397

COLOR CHART

Sterling B. McDonald, Chicago, Ill.

Application October 20, 1937, Serial No. 169,923

7 Claims. (Cl. 88—14)

The invention relates to color charts and more particularly to color charts for determining color harmony and various like relations between different colors.

The primary object of the present invention is to provide a device of the type set forth which may be easily and quickly manipulated to determine a certain related color or colors with respect to any other selected color as, for example, the direct complement of the selected color, its split complement, or a triad including the selected color.

A more specific object of the invention is to provide in a color chart having a plurality of radially disposed color panels, a central adjustable pointer mechanism embodying a plurality of cooperating interconnected adjustable pointers for substantially automatically indicating any desired color relation such as those set forth above.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawing in which.

For purposes of illustration of its various novel features the invention has been shown herein as embodied in a chart particularly designed for the use of artists, art students, decorators and designers in determining desired color harmonies and combinations. This chart embodies a flat rectangular base 10 on which are painted, printed, or otherwise applied a plurality of separate color panels 11 disposed radially about a common central point in spectrum sequence. As illustrated, the color panels 11 are preferably sector-shaped in order to economize space on the chart. The colors of the various panels are indicated by corresponding indicia 12 about the periphery of the circular group of panels. Preferably twelve such color panels 11 are utilized in order to simplify the manipulation of the pointer mechanism in determining triads and for like purposes as is hereinafter described in greater detail.

Each of the color panels 11 is divided into a plurality of sections or subpanels 11$^a$ which preferably have a radial arrangement of successively different hues of the same color. Thus, the inner one of the subpanels 11$^a$ may be of a very light hue of the color with successively deeper or darker hues of the color arranged outwardly therefrom. The user of the chart is thus enabled to visualize very easily an infinite variety of hues of the same color. As an aid in visualizing intermediate colors between those of adjacet panels a plurality of small blocks of color 13 may preferably be applied to the base 10 at the ends of the division lines between the panels 11. For example, between the blue panel and the blue-violet panel a small block colored blue-blue-violet would be used.

Figure 2:
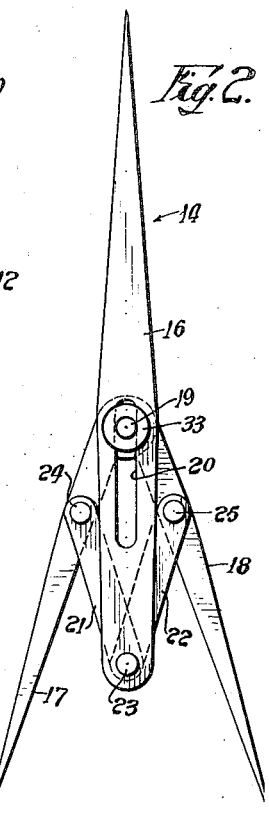
Fig. 2 is an enlarged detail view of one of the pointer mechanisms included in the device of Fig. 1.

In accordance with one aspect of the present invention a pointer arrangement is provided which may be readily manipulated to determine various color harmonies. Preferably, this pointer arrangement embodies two pointer mechanisms designated generally by the numerals 14 and 15, which are substantially identical in construction and consequently a detailed description of one will serve for both. Thus, upon reference to Fig. 2, it will be seen that the pointer mechanism 14 embodies a main pointer 16 and a pair of cooperating auxiliary pointers or divider arms 17 and 18. These latter elements have been designated as divider arms since they are pivoted at the center of the chart on a pin 19 for swinging movement toward and away from each other so that the general construction resembles that of an ordinary pair of dividers such as is used by draftsmen. The pin 19 also extends through a longitudinal slot 20 in the main pointer 16 so that this latter pointer is mounted for not only rotational movement about the center point of the chart but is also disposed for endwise or axial movement with respect thereto.

In order to maintain the center line of the main pointer 16 always coincident with a line bisecting the angle formed between the divider arms 17—18 a linkage is provided which is operatively connected to the pointers 16—17—18. In the illustrative construction this linkage includes a pair of links 21—22 which are connected at one end to the lower extremity of the main pointer 16 by a common pivot pin 23 and at their outer ends respectively to the divider arms 17 and 18 by pivot pins 24 and 25. It will thus be seen that as the divider arms 17 and 18 are moved toward and away from each other or in other words, as the divider is opened and closed, the links 21—22 will maintain the divider arms equally spaced from the projected center line of the main pointer 16. Moreover, this relation is maintained irrespective of either the opening and closing adjustment of the divider arms 17—18 or the bodily rotation of the entire pointer mechanism.

Figure 1:
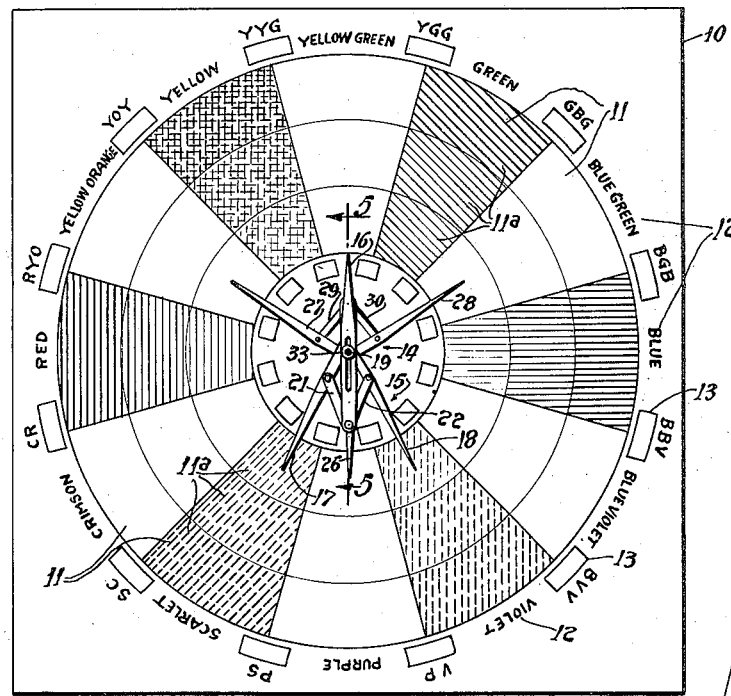
Figure 1 is a plan view of a color chart embodying the invention.
Figure 5:
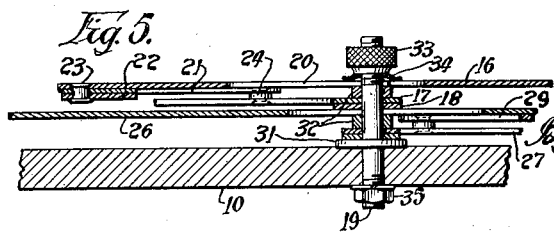
Fig. 5 is an enlarged detail sectional view along the line 5—5 in Fig. 1.

As was previously noted, the pointer mechanism 15 is substantially identical with the pointer mechanism 14 and embodies in general a main pointer 26, mounted on the pin 19 for rotational and axial sliding movement, as well as divider arms 27—28 pivoted on the pin 19 and connected to the main pointer 26 by links 29—30, respectively. Upon reference to Fig. 5 it will be seen that a nut 35 threaded on the lower end of the pin 19 cooperates with a fixed washer or shoulder 31 on the pin to hold the pin rigidly in position on the base 10. Spacers 32 about the pin 19 serve to separate the pivoted ends of the divider arms from the cooperating main pointers. A nut 33 threaded on the outer end of the pin bears against a resilient washer 34 to provide means for holding both pointer mechanisms in fixed relation, thereby preventing relative movement between the respective main pointers 16 and 26. Preferably, these main pointers are disposed in diametrically opposed relation as indicated in Fig. 1.

Figure 3:
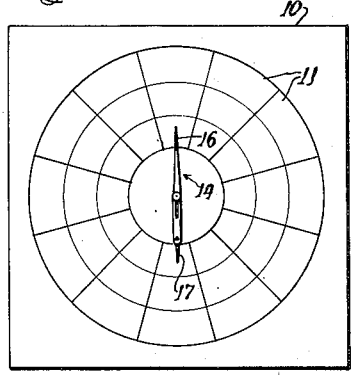
Figs. 3 and 4 are diagrammatic illustrations of certain pointer arrangements used in determining respectively the direct complement of a color and a triad embodying any selected color.

In the operation of the device described above the direct complement of any selected color may be determined by the use of one of the pointer mechanisms alone or by the use of the two of them in conjunction. Thus, when one pointer mechanism is used alone the two divider arms are brought together so that they are in alinement with the projected center line of the main pointer 16 as indicated in Fig. 3. The main pointer 16 may then be rotated into registry with any selected cooler panel and the divider arms 17—18 will indicate the panel which contains the direct color complement of the selected color or in other words, the color which when mixed with the selected color will form a neutral gray.

Figure 4:
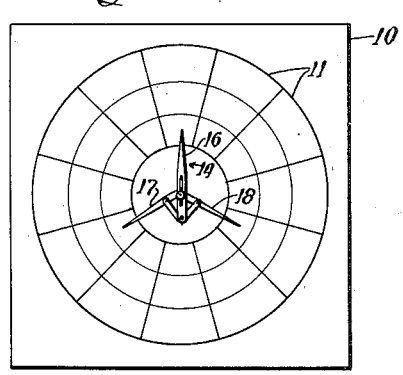

In the event that it is desired to determine a triad, or in other words, three colors which when added together form a neutral gray, the divider arms 17—18 are opened to a position in which they are separated by an arc of 120° (Fig. 4). When so adjusted, the main pointer 16 and the divider arms 17—18 are all separated by arcs of 120°. After such adjustment the main pointer 16 may be readily rotated into registry with any selected color panel and the divider arms will then be in registry with the two color panels which constitute the remaining members of the triad for the selected color. In the color panel arrangement preferred in which twelve color panels are utilized, it will be seen that accurate indication of the triad is always had.

The pointer mechanism 14 may be also conveniently utilized to determine any split complement for a selected color. A triad is of course simply a special case of a split complement. Thus, when the divider arms 17 and 18 are moved to embrace an arc containing any desired number of color panels the color panels thus embraced between the dividers constitute the split complement of the selected color indicated by the main pointer. In this connection it should be noted that the colors of the panels indicated directly by the divider arms 17—18 will combine with the selected color indicated by the main pointer to form a neutral gray, as will the totality of the colors on the panels embraced between the divider arms.

By the use of a second pointer mechanism such as the pointer mechanism 15 a ready determination of double split complements may be had. That is, any adjacent group of color panels may be indicated by moving one set of divider arms, such as the arms 17—18, to embrace them. Then the group of colors made up of any desired number which constitutes the complement of the first group is indicated by the colors included in the arc embraced by the divider arms 27—28. The arrangement of the two sets of divider arms for this purpose is indicated for example in Fig. 1.

Although a particular embodiment of the invention has been shown and described in some detail for purposes of illustration, there is no intention to thereby limit the invention to such embodiment but on the other hand, the appended claims are intended to cover all modifications within their terms.

I claim as my invention:

1. In a device of the type set forth a base having a plurality of color panels thereon arranged radially about a common central point in spectrum sequence with complementary colors diametrically opposed and with colors forming a triad separated by arcs of 120°, a main pointer pivotally mounted at said central point and swingable into registry with any selected one of said color panels, a pair of divider arms, means pivotally supporting said divider arms at said central point for bodily movement with said main pointer, said divider arms when closed being disposed in a position diametrically opposed to said main pointer and serving in this position to indicate the direct color complement of the color panel selected with said main pointer, and means for maintaining the center line between said divider arms when they are in any open position in registry with the projected center line of said main pointer whereby the arc of color panels embraced by said divider arms constitutes a split complement of the color selected with the main pointer.

2. In a device of the type set forth a base having a plurality of color panels thereon arranged in spectrum sequence about a common center with complementary colors diametrically opposed and with colors forming a triad separated by arcs of 120°, a main pointer pivotally mounted at said center and adjustable into registry with any selected one of said color panels, a pair of auxiliary pointers pivotally mounted at said center for adjustment from an alined position diametrically opposed to said pointer relatively outwardly in opposite directions from said position to embrace a selected arc of color panels, and means for maintaining equality of displacement of said auxiliary pointers from said position, said auxiliary pointers in said alined position serving to indicate the direct color complement of the color panel selected with said main pointer and said arc of color panels constituting a split complement of the color selected with the main pointer.

3. In a device of the type set forth a base having a plurality of color panels thereon arranged in generally circular spectrum sequence with complementary colors diametrically opposed and with colors forming a triad separated by arcs of 120°, a main pointer pivotally mounted at the central point for movement into registry with any selected one of said color panels, a second pointer similarly mounted and extending oppositely to said main pointer, two pairs of divider arms pivoted at said central point and movable bodily with respective ones of said pointers, each of said pairs of divider arms when closed being disposed in a position diametrically opposed to the associated pointer, and means for maintaining the center line between each of said pairs of divider arms when they are in any open position in registry with the projected center line of their associated pointer whereby the color panels embraced by one pair of open divider arms represent a split complement of the colors embraced by the other pair of divider arms.

4. In a device of the type set forth a base having a plurality of color panels thereon arranged radially about a common central point in spectrum sequence with complementary colors diametrically opposed and with colors forming a triad separated by arcs of 120°, a main indicator mounted at said central point for movement into registry with any selected one of said color panels, a pair of relatively movable members each pivoted for bodily swinging movement about said central point, said members having one coextensive position in which they extend substantially as a continuation of said indicator, and means for maintaining equality of displacement of said members upon relative movement thereof from said coextensive position.

5. In a device of the type set forth a base having a plurality of color panels thereon arranged radially about a common central point in spectrum sequence with complementary colors diametrically opposed and with colors forming a triad separated by arcs of 120°, a pair of pointer mechanisms cooperating with said color panels to indicate various color relations therebetween, each of said pointer mechanisms embodying a main pointer and a pair of divider arms all pivotally mounted at said central point, means for maintaining said pointers in diametrically opposed relation, means supporting the arms of each of said pairs of divider arms for relative movement toward and away from each other, and means for adjustably maintaining said divider arms spaced selectively variable equal distances from the center lines of their respective pointers.

6. The combination, with a base having a plurality of color panels thereon arranged about a central point in spectrum sequence with complementary colors diametrically opposed and with colors forming a triad separated by arcs of 120°, of a pair of pivotally connected arms swingable toward and away from each other, means for supporting said arms for bodily swinging movement at said central point and about the same, a pointer mounted for pivotal movement at said central point and lying between said arms when the latter are spaced apart, and means including links operatively connected to said pointer and to said arms for maintaining said pointer in a central position with respect to the divider arms irrespective of adjustments in the position of the latter.

7. The combination with a base having a plurality of color panels thereon arranged radially about a common central point in spectrum sequence with complementary colors diametrically opposed and with colors forming a triad separated by arcs of 120°, of a pair of dividers embodying a pair of arms, means for pivotally supporting said divider arms at said central point for bodily swinging movement toward and away from one another and about said central point, indicating means movable into registry with successive ones of said color panels, and means operatively connecting said arms with said indicating means for maintaining the latter in registry with the center line between said divider arms irrespective of the position of bodily adjustment of said arms about said central point or with respect to each other.

STERLING B. McDONALD.